Aug. 26, 1941.  H. KLAUE  2,254,074
BRAKE WHEEL, PARTICULARLY FOR AIRCRAFT
Filed Nov. 13, 1939
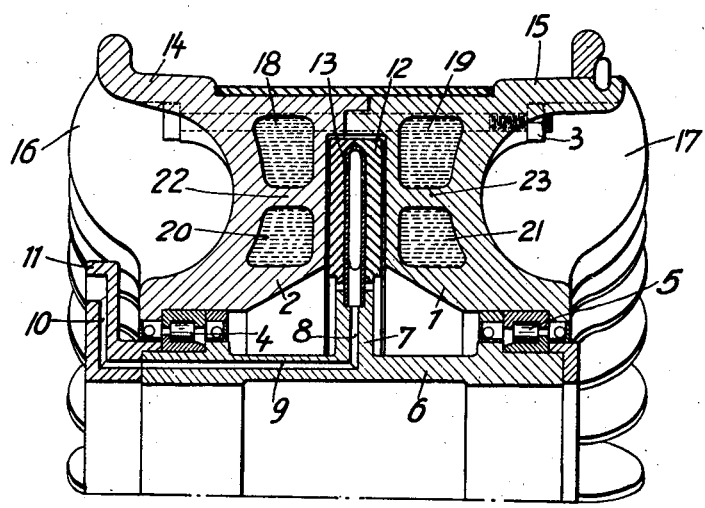
Inventor:
HERMANN KLAUE
By: Haseltine, Lake & Co
Attorneys Patented Aug. 26, 1941

2,254,074

UNITED STATES PATENT OFFICE 2,254,074

BRAKE WHEEL, PARTICULARLY FOR AIRCRAFT

Hermann Klaue, Berlin-Frohnau, Germany, assignor to Argus Motoren Gesellschaft m. b. H.

Application November 13, 1939, Serial No. 304,010
In Germany August 1, 1939

4 Claims. (Cl. 188—264)

Due to the high landing speeds of modern aircraft a powerful braking is required, because in spite of the high speeds short run out courses are allowed only. The braking, however, means that the dynamic energy of the entire weight of the aircraft is to be transformed into heat. For carrying out this transformation very short time only is available. If, for instance, an aircraft landing with a speed of 100 km./h. is to be brought to a standstill or to be arrested on a run out of 400 meters, the time available for braking is 14 seconds. If the aircraft to be braked has a weight of about 10,000 kg., then the quantity of heat formed by the braking amounts to about 1600 Kcal. (1 Kcal.=427 kg./m./sec.), (other braking factors, as resistance to rolling, air resistance and so on being already considered). These heat quantities cannot easily be conducted to the atmosphere in the time available for this purpose and, therefore, must otherwise be dealt with.

In a view of obtaining as simple and resistant a construction of brake and wheel body as possible, the heat quantities are absorbed according to the invention by the material of the brake and wheel body itself. In connection with aircraft wheels consisting of light metal, for instance electron (registered trade-mark), this absorption of heat by the material of the wheels is evident, as these metals are of high thermal capacity. The absorption of the above mentioned large quantities of heat, however, would lead to an essential increase in weight of the wheel bodies which would far surpass the weight required for the reasons of strength. This drawback is, according to the invention, obviated by the fact that recesses adapted to be filled with a liquid having a higher thermal capacity than the material forming the wheel body are provided in the neighborhood of the heat producing brake surfaces. If, for instance, ethyl alcohol is used which does not affect or attack light metals free of Cu, as silumin and electron (registered trade-marks), then a substantial economy in weight results from the fact that 1 kg. ethyl alcohol may absorb 3.5 times the quantity of heat absorbed by electron. Assumed for instance, that the temperature of the wheel body (near the brake) and, therefore, also the temperature of the ethyl alcohol enclosed in the wheel body is 180° then the pressure of the saturated vapour of the ethyl alcohol amounts to an absolute atmospheric pressure of 25 which easily may be dealt with.

In the accompanying drawing one construction according to the present invention is shown by way of example in cross-section through one half of the wheel.

The wheel body shown in the drawing consists of the two parts 1 and 2 which are connected together by bolts 3. By means of roller bearings 4 and 5 the composed wheel body is mounted upon the fixed hub 6. In the center of the two parts 1 and 2 of the wheel body an annular opening is formed into which extends a socket 7 of the hub 6. A channel 8 provided in the socket 7 is connected to a channel 9 formed in the hub 6 and to a channel 10 present in the socket 11. The channels 8—10 serve the purpose of supplying braking liquid to the interior of the disc brake 12 consisting of two axially reciprocatable brake discs. An inflatable casing 13 is provided between the brake discs adapted to receive the braking liquid. The construction of this brake shows particularities but nevertheless does not form the subject matter of the invention and, therefore, need not be explained in detail.

The wheel body formed of the two parts 1 and 2 is of very compact and rigid construction. The far overhanging felloes 14 and 15 are supported by ribs 16 and 17. If desired, the latter may be curve-shaped so that the wheel body is rotated by the relative air current of the aircraft. The effect of the ribs also is a better heat conduction to the atmosphere.

In the two parts of the wheel recesses 18, 19 and 20, 21 are provided near the brake surfaces which recesses serve the purpose of receiving a liquid. In the modification shown, two recesses are provided in each part of the wheel body, because the webs or studs 22, 23 remaining between the recesses 18, 20 and 19, 21 respectively serve for supporting the brake surfaces.

When choosing the liquid to be filled into the recesses, care is to be taken, on the one hand, to use a liquid having a thermal capacity as high as possible but, on the other hand, the material forming the wheel body is to be considered.

In the example shown 2 kg. of ethyl alcohol are provided in each of the two parts of the wheel body so that 4 kg. of liquid are present which with regard to their thermal capacity replace 14 kg. of electron.

In a single wheel according to the invention constructed for aircrafts having a high landing speed not less than 10 kg. of weight are saved.

The cooling ribs shown, moreover, have the advantage of shortening the cooling periods. For instance, cooling periods of 5 minutes only may be obtained so that an aircraft shortly after having landed may again be braked.

What I claim is:

1. A brake wheel particularly adapted for use upon aircraft, including a metal wheel body proper having brake means positively rotating with said wheel body, comprising a metal wall of moderate thickness integral with the latter and constituting a braking surface portion disposed in a position adapting the same to be frictionally engaged by a brake, a massive metal wall connected upon the inner side thereof to the first metal wall and enclosing at least one self-contained, closed chamber between the two walls for containing a heat absorbing fluid, and a plurality of metal fins upon the exterior side of said massive wall and exteriorly of said closed chamber, said first wall, chamber, massive wall and fins forming a heat transfer series from the vicinity of the brake through the first wall, then through the fluid in the closed chamber, thence gradually into the massive wall and the structure of the wheel generally, thereafter into the fins and finally from said fins into the atmosphere.

2. A brake wheel particularly adapted for use upon aircraft, including a metal wheel body proper having two opposite brake means positively rotating with said wheel body, comprising two spaced inner metal walls of moderate thickness integral with the wheel body and disposed on the two opposite sides of a brake so as to be frictionally engaged simultaneously thereby, said wheel body also having upon each side a massive metal wall respectively connected to the inner wall upon the same side of the brake and together with said inner wall enclosing at least one self-contained, closed chamber therebetween for containing a heat absorbing fluid, and a plurality of metal fins upon the exterior side of each of the two massive walls exteriorly of the closed chamber respectively disposed within the same, each side of said wheel body forming a heat transfer series for transferring the heat from the brake through the inner wall in said side to the fluid in the respectively adjacent closed chamber, thence gradually into the massive wall and adjacent structure of the same side of the wheel body generally, thereafter into the fins upon said massive wall and finally from said fins into the atmosphere.

3. A brake wheel according to claim 1, having a plurality of self-contained, closed chambers for the heat absorbing fluid located substantially equally adjacent to the first wall and having metal partition means completely separating the chambers and directly and integrally connecting the first wall with the massive wall between said chambers.

4. A brake wheel according to claim 2, having in each side of the wheel body on the opposite sides of the brake, a plurality of self-contained, closed chambers for the heat-absorbing fluid located substantially equally adjacent to inner wall and having metal partition means completely separating said chambers and integrally connecting said inner wall with the massive wall between said closed chambers.

HERMANN KLAUE.